United States Patent
Farrenkopf et al.

(10) Patent No.: US 8,990,732 B2
(45) Date of Patent: Mar. 24, 2015

(54) VALUE INTERVAL SELECTION ON MULTI-TOUCH DEVICES

(75) Inventors: Eckhard Farrenkopf, Schriesheim (DE); Hans-Juergen Richstein, Rauenberg (DE); Daniel Markwig, Heidelberg (DE)

(73) Assignee: SAP SE, Walldorf (DE)

( * ) Notice: Subject to any disclaimer, the term of this patent is extended or adjusted under 35 U.S.C. 154(b) by 480 days.

(21) Appl. No.: 12/780,191

(22) Filed: May 14, 2010

(65) Prior Publication Data

US 2011/0283188 A1    Nov. 17, 2011

(51) Int. Cl.
- *G06F 3/048* (2013.01)
- *G06F 3/0484* (2013.01)
- *G06F 3/0488* (2013.01)
- *G06F 3/0485* (2013.01)

(52) U.S. Cl.
CPC .......... *G06F 3/04847* (2013.01); *G06F 3/0488* (2013.01); *G06F 3/04855* (2013.01); *G06F 2203/04808* (2013.01)
USPC ........... 715/833; 715/702; 715/863; 715/772; 345/173

(58) Field of Classification Search
USPC ..................... 715/702, 863, 833, 772; 702/65; 345/173
See application file for complete search history.

(56) References Cited

U.S. PATENT DOCUMENTS

| | | | |
|---|---|---|---|
| 4,277,784 A * | 7/1981 | Hyltin | 345/87 |
| 5,376,947 A * | 12/1994 | Kuroda | 345/173 |
| 5,448,262 A * | 9/1995 | Lee et al. | 345/212 |
| 5,535,324 A | 7/1996 | Alvarez et al. | |
| 5,659,768 A * | 8/1997 | Forbes et al. | 715/201 |
| 5,856,822 A * | 1/1999 | Du et al. | 345/73 |
| 6,112,214 A | 8/2000 | Graham et al. | |
| 6,229,528 B1 * | 5/2001 | Okajima et al. | 345/173 |
| 7,191,410 B1 | 3/2007 | Kruempelmann et al. | |
| 7,660,900 B2 | 2/2010 | Sattler et al. | |
| 7,693,948 B2 | 4/2010 | Heix et al. | |
| 7,707,506 B2 | 4/2010 | Weigel et al. | |
| 7,765,491 B1 * | 7/2010 | Cotterill | 715/833 |
| 8,451,232 B2 * | 5/2013 | Tolmasky et al. | 345/173 |
| 8,487,888 B2 * | 7/2013 | Wigdor et al. | 345/173 |
| 2005/0007959 A1 * | 1/2005 | Tomonaga et al. | 370/248 |
| 2005/0212756 A1 * | 9/2005 | Marvit et al. | 345/156 |
| 2006/0095372 A1 | 5/2006 | Venkatasubramanian et al. | |

(Continued)

OTHER PUBLICATIONS

Extended European Search Report issued in European Application No. 11003718.1 on Aug. 19, 2011; 7 pages.

(Continued)

*Primary Examiner* — Doon Chow
*Assistant Examiner* — David Choi
(74) *Attorney, Agent, or Firm* — Fish & Richardson P.C.

(57) ABSTRACT

This disclosure provides examples of computerized methods and software for receiving time-based interval selections on multi-touch devices. In one aspect, a time interval slider is displayed in a portion of a graphical user interface, where the time interval slider is a listing of time values in a single dimension at a first granularity level. A request is received via a multi-touch gesture to change from the first granularity level of time values to a second granularity level of time values in the time interval slider. In response, an updated set of time values at a second granularity level is displayed within the time interval slider. A selection of a first time value is received for a first endpoint in a time interval via a first touch input, and a selection of a second time value is received for a second endpoint in the time interval via a second touch input.

26 Claims, 8 Drawing Sheets

(56) References Cited

U.S. PATENT DOCUMENTS

| | | | |
|---|---|---|---|
| 2006/0095373 A1 | 5/2006 | Venkatasubramanian et al. | |
| 2007/0136676 A1 | 6/2007 | Kruempelmann et al. | |
| 2008/0015919 A1 | 1/2008 | Busse et al. | |
| 2008/0062176 A1 | 3/2008 | Arya | |
| 2008/0140785 A1 | 6/2008 | Farrenkopf et al. | |
| 2008/0155105 A1 | 6/2008 | Sattler et al. | |
| 2008/0168395 A1* | 7/2008 | Ording et al. | 715/833 |
| 2008/0294994 A1* | 11/2008 | Kruger et al. | 715/733 |
| 2009/0089739 A1* | 4/2009 | Mollicone et al. | 717/105 |
| 2009/0138884 A1* | 5/2009 | Kakeda et al. | 718/104 |
| 2009/0174680 A1* | 7/2009 | Anzures et al. | 345/173 |
| 2009/0313567 A1* | 12/2009 | Kwon et al. | 715/769 |
| 2010/0017734 A1* | 1/2010 | Cummins et al. | 715/769 |
| 2010/0100424 A1* | 4/2010 | Buchanan et al. | 705/10 |
| 2010/0259486 A1* | 10/2010 | Anson et al. | 345/173 |
| 2010/0283743 A1* | 11/2010 | Coddington | 345/173 |
| 2011/0283188 A1* | 11/2011 | Farrenkopf et al. | 715/702 |

OTHER PUBLICATIONS

"Multi-touch," Wikipedia, [online], <http://en.wikipedia.org/w/index-php?title=Multi-touch&printable=yes>, retrieved May 3, 2010, 5 pages.

"iPad," Wikipedia, [online], <http://en.wikipedia.org/w/index-php?title=iPad&printable=yes>, retrieved May 3, 2010, 15 pages.

* cited by examiner

FIG. 6
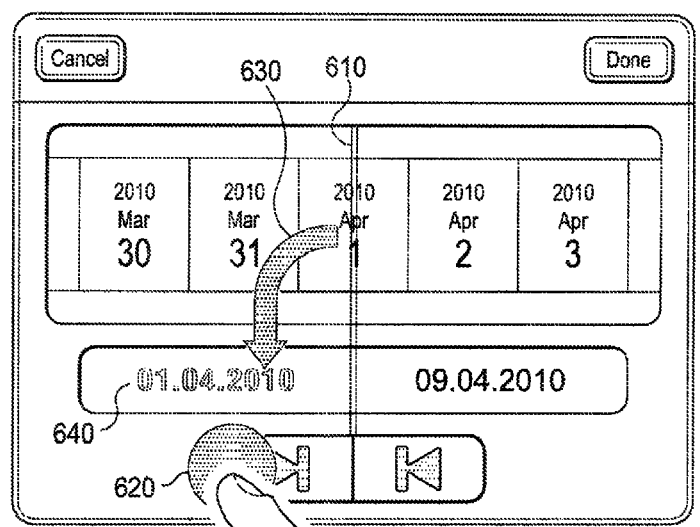
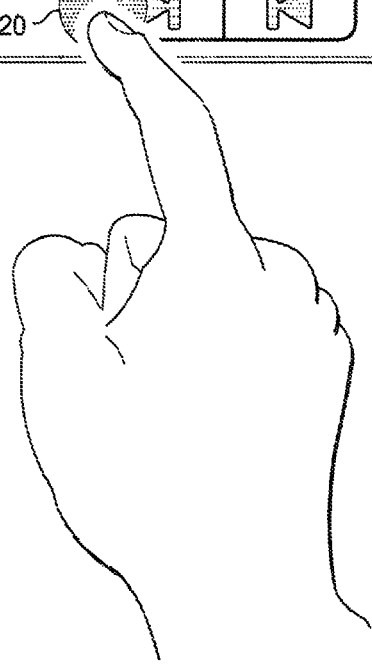

VALUE INTERVAL SELECTION ON MULTI-TOUCH DEVICES

TECHNICAL FIELD

The present disclosure relates to methods, software, and devices for selecting intervals of values, and, more specifically, to methods, software, and devices for selecting intervals of values on multi-touch devices.

BACKGROUND

Value intervals are important criteria in many applications, including analytical applications, dashboards, and other systems associated with metrics. By providing a value interval, responsive data can be presented to users to allow for a filtered set of data to be provided. Time-based intervals are one particular type of interval relevant to reporting and analytics. By providing a defined time period or interval, data sets can be filtered and analyzed in order to provide information specific and limited to the defined time range. Other types of intervals or ranges may also be used to filter and analyze data as appropriate, including geographical regions, product categories, job types, as well as any other data or information suitable for value intervals.

Touch screen and multi-touch devices provide methods for entering information through the use of a pointer, finger, or other touch-based device or tool. In general, multi-touch devices provide users with the ability to apply multiple finger gestures simultaneously onto a visual display in order to send complex commands to the device. Current methods of selecting value intervals include using a visualization of a monthly calendar to select a start and end date and/or time for a time interval by selecting specific dates on the calendar display. In these methods, time interval information can be input by a mouse, keyboard, or touch screen by selecting a specific date, and then separately selecting a particular time during the day. Additionally, some touch screen devices may provide a time interval selection mechanism that uses a visualization of "rolling" values to enter times. In those instances, users can manipulate separate bars, each containing information on discrete values for each of the date, hour, minute, and/or second, to select a specific time. After selecting a first value, users can then repeat the process to select another time interval endpoint.

SUMMARY

This disclosure provides examples of computerized methods and software for receiving time-based interval selections on multi-touch devices. In one aspect, a time interval slider is displayed in a portion of a graphical user interface, where the time interval slider is a listing of time values in a single dimension at a first granularity level. A request is received via a multi-touch gesture to change from the first granularity level of time values to a second granularity level of time values in the time interval slider. In response, an updated set of time values at a second granularity level is displayed within the time interval slider. A selection of a first time value is received for a first endpoint in a time interval via a first touch input, and a selection of a second time value is received for a second endpoint in the time interval via a second touch input.

While generally described as computer implemented software that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 6 is an example of selecting a particular value from the example value interval slider illustrated in FIG. 4.

DETAILED DESCRIPTION

This disclosure generally describes methods, devices, and systems for visualizing, viewing, selecting, and defining a set of value intervals to be applied to underlying information or data, as well as for providing value ranges to applications or other outputs. In particular, the present disclosure describes the use of a value interval slider (illustrated, for example, in FIG. 4), which allows users to not only select the beginning and end values for a defined range, but to also select values from various levels of value granularity through the use of multi-touch gestures in connection with the value interval slider. In contrast to other value interval selection methods (such as a calendar for selecting dates), the value interval slider described herein allows the visualization of possible value intervals at varying granularity ranges. For example, the same value interval slider can initially define a first granularity of values (for example, date values), and, using multi-touch gestures (for example, a pinch or reverse-pinch) can change to a different granularity of information (for example, hours or years) in the same display. By allowing the interval slider to provide different value granularities, users can select different types or granularities of information to define a single range without having to use multiple displays and/or value sliders. The disclosed mechanism allows for more convenient and business-relevant ranges and/or filters to be applied to underlying data or information that allow increased user flexibility and ease of use, while also centralizing the data entry mechanism to a single, intuitive display. For example, a specific start date may be known for a range, while the end date is generally a year in the future. The value interval slider provides a solution where these two different levels of granularity can be expressed and selected using a single input interface.

Figure 1:
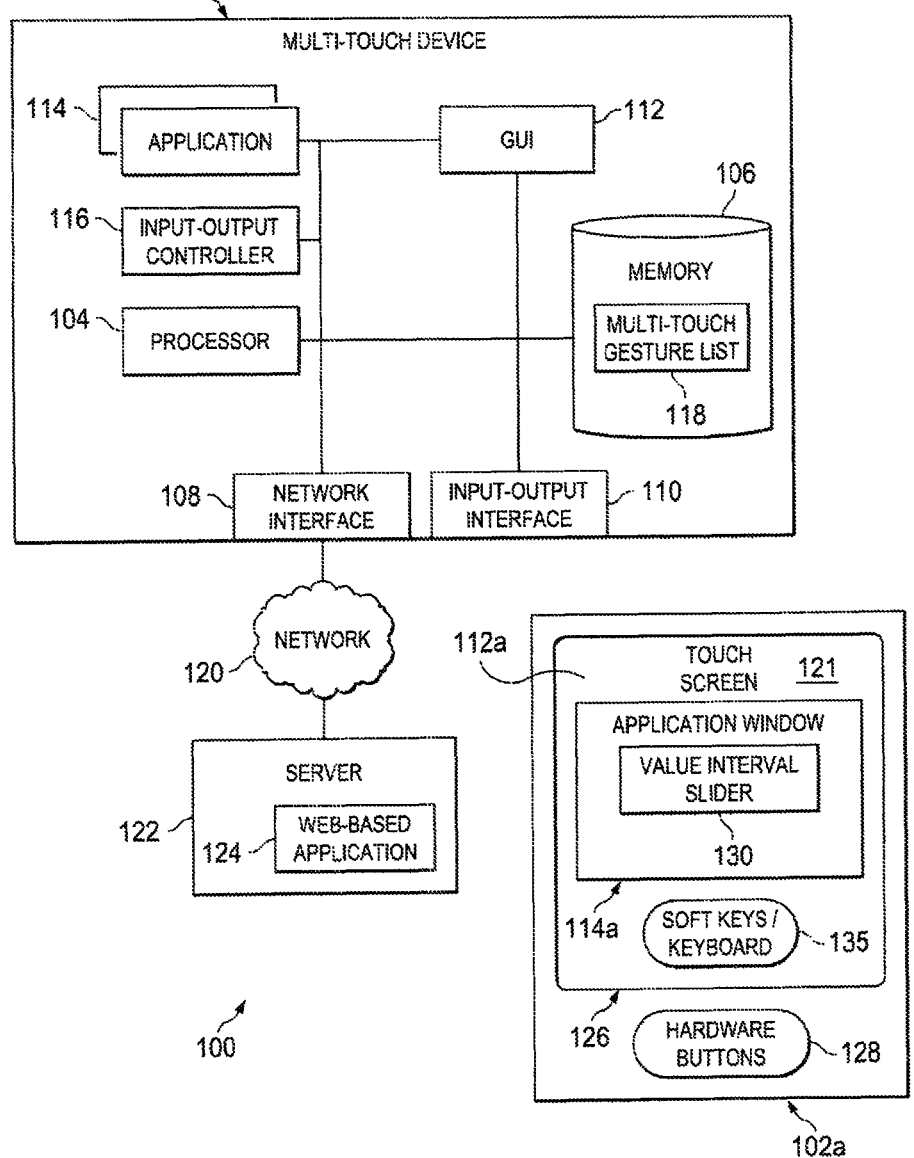
FIG. 1 illustrates an example system for visualizing and selecting a value interval using a multi-touch enabled device in accordance with one embodiment of the present disclosure.

FIG. 1 provides one example environment 100 wherein the value interval slider mechanism can be implemented. As illustrated in FIG. 1, environment 100 includes a multi-touch device 102, a network 120, and a server 122. In some instances, neither the network 120 nor the server 122 may be a part of the environment 100, or may be otherwise unnecessary, such as when the multi-touch device 102 does not have an available connection to the network 120, as well as when the device's 102 operations are performed locally. The multi-touch device 102 and the server 122 can communicate across network 120, where applicable. In general, environment 100 depicts an example configuration of a system capable of visualizing, viewing, selecting, and defining an interval of values for use with a software application, database, or other set of data.

In general, the multi-touch device 102 can comprise any computer or other processing device which executes or displays information associated with one or more applications, and which receives and processes input from at least one touch-based gesture. Additionally, the multi-touch device 102 is capable of receiving touch input based on multiple finger gestures simultaneously applied onto the touch screen 121 of the device 102. Different types of multi-touch devices 102 may be used in accordance with the present disclosure. For example, different size multi-touch devices 102 may be used, as well as multi-touch devices 102 where the touch screen 121 is in a separate housing or structure than the processing portions of the device 102. In the current environment 100, the multi-touch device 102 is considered to be located in a single housing enclosing both the touch screen 121 and the various internal processors, memory, and other components of the multi-touch device 102. In some instances, the touch screen 121 may be a liquid crystal display (LCD). Further, the touch screen 121 may recognize touch-based inputs based on electrical conductivity, relative pressure from a touch, using light-sensitive sensors to determine contacts to the touch screen 121, as well as any other suitable touch input mechanism or combination thereof. Some examples of multi-touch devices 102 include Apple's iPhone smartphone and iPad tablet device, Google's Nexus One smartphone, HTC's Hero, Legend, and Desire smartphones, Microsoft's Zune HD media device, Palm's Pre smartphone, Motorola's Droid smartphone, as well as numerous other consumer and/or business-related devices and accessories capable of receiving and processing multi-touch inputs.

In the implementation illustrated in FIG. 1, the multi-touch device 102 includes a processor 104, a memory 106, a network interface 108, an input-output interface 110, an input-output controller 116, at least one application 114, and a graphical user interface 112. The network interface 108 is used by the multi-touch device 102 for communicating with other systems, computers, or devices within or external to environment 100, such as through the multi-touch device's 102 connection to the network 120. Generally, the network interface 108 comprises logic encoded in software and/or hardware in a suitable combination and operable to communicate with the network 120. More specifically, the network interface 108 may comprises software supporting one or more communication protocols associated with communications such that the network 120 or hardware is operable to communicate physical signals within and outside of the illustrated environment 100.

Generally, the network 120 facilitates wireless or wireline communications between the components of the environment 100 (i.e., between the multi-touch device 102 and the server 122), as well as with any other local or remote computer, such as additional clients, servers, or other devices communicably coupled to network 120 but not illustrated in FIG. 1. The network 120 is illustrated as a single network in FIG. 1, but may be a continuous or discontinuous network without departing from the scope of this disclosure, so long as at least a portion of the network 120 may facilitate communications between senders and recipients. The network 120 may be all or a portion of an enterprise or secured network, while in another instance at least a portion of the network 120 may represent a connection to the Internet. In some instances, a portion of the network 120 may be a virtual private network (VPN), such as, for example, the connection between the multi-touch device 102 and the server 122. Further, all or a portion of the network 120 can comprise either a wireline or wireless link. Example wireless links may include 802.11a/b/g/n, 802.20, WiMax, and/or any other appropriate wireless link. In other words, the network 120 encompasses any internal or external network, networks, sub-network, or combination thereof operable to facilitate communications between various computing components inside and outside the illustrated environment 100. The network 120 may communicate, for example, Internet Protocol (IP) packets, Frame Relay frames, Asynchronous Transfer Mode (ATM) cells, voice, video, data, and other suitable information between network addresses. The network 120 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, the multi-touch device 102 includes a processor 104. Although illustrated as a single processor 104 in FIG. 1, two or more processors may be used according to particular needs, desires, or particular embodiments of environment 100. Each processor 104 may be a central processing unit (CPU), a blade, an application specific integrated circuit (ASIC), a field-programmable gate array (FPGA), or another suitable component. Generally, the processor 104 executes instructions and manipulates data to perform the operations of multi-touch device 102, often using software. Specifically, the multi-touch device's processor 104 executes the functionality required to execute the illustrated application 114, interact with the web-based application 124, interpret touch and multi-touch gestures received via the touch screen 121 (recognized and decoded by the input-output interface 110) using the input/output controller 116, as well as any other software functionality performed or available on the multi-touch device 102. Regardless of the particular implementation, "software" may include computer-readable instructions, firmware, wired or programmed hardware, or any combination thereof on a tangible medium as appropriate. Indeed, each software component may be fully or partially written or described in any appropriate computer language including C, C++, Java, Visual Basic, assembler, Perl, any suitable version of 4GL, as well as others, including languages and operating systems designed specifically for mobile and/or multi-touch devices. It will be understood that while portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

As described, the processor 104 executes the one or more applications 114, as well as the operations associated with the input-output controller 116. The applications 114 may be any appropriate software, including, but not limited to, a web browser, an analytical business application, general utilities, word processing software, or any other software suitable for use on the multi-touch device 102. Further, one or more of the applications 114 may represent software associated with or working in conjunction with a web-based application 124 located and/or executed remotely from the multi-touch device 102.

The input-output controller 116 may comprise software capable of interpreting one or more touch and/or multi-touch gestures received and identified by the input-output interface 110, the input-output interface 110 associated with the touch screen 121 of the device 102. When specific gestures are received at the touch screen 121 and recognized or identified by the input-output interface 110, those gestures are interpreted by the input-output controller 116 to determine their meaning and function within a particular executing application 114 or for use with an underlying operating system or functionality included with the multi-touch device 102. For instance, a pinching gesture, performed by simultaneously contacting the touch screen 121 with two fingers and bringing them towards each other, may have different meanings and functionality in different instances and applications. In one instance, the pinch may cause a zoom (for instance, in a map or web browsing application), while in other instances, the pinch may change the granularity of a set of values presented on the screen. Alternatively, the pinch gesture may have a universal meaning independent of any particular application, such that a received and identified pinch gesture causes the some response by the input-output controller 116 in any instance. As illustrated, the input-output controller 116 can access a list, table, database, or any other set of information defining the set of recognized touch and multi-touch gesture, illustrated in FIG. 1 as the multi-touch gesture list 118 (and stored in memory 106). The multi-touch gesture list 118 may comprise a list of cross-referencing information used by the input-output controller 116 to determine the context-specific meaning of a particular gesture received and relayed by the input-output interface 110 to the input-output controller 116. In some instances, an application 114 or other running software may include instructions that supersede the gesture meanings stored in the multi-touch gesture list 118, and which are used during the runtime of that particular application 114 or software. Additionally, the multi-touch gesture list 118 may define a plurality of multi-touch and touch gestures defined by a touch-based or touch-related operating system, such that the various gestures provide building blocks upon which complicated and additional signals and commands can be based. By combining one or more gestures, or assigned those gestures to a specific task, various commands and actions can be generated by software and user interface developers.

Memory 106 within the multi-touch device 102 may include any memory or database module and may take the form of volatile or non-volatile memory including, without limitation, magnetic media, optical media, random access memory (RAM), read-only memory (ROM), removable media, or any other suitable local or remote memory component. Memory 106 may store various objects or data, including classes, frameworks, applications, backup data, business objects, jobs, web pages, web page templates, multi-touch gesture lists 118 (as illustrated), database tables, repositories storing business or other dynamic information, or any other information including any parameters, variables, algorithms, instructions, rules, constraints, or references thereto relevant to the purposes or operations of the multi-touch device 102. Additionally, memory 106 may include any other appropriate data, such as VPN applications, firmware logs and policies, firewall policies, a security or access log, print or other reporting files, as well as others.

The multi-touch device 102 further includes a graphical user interface (GUI) 112. In general, the GUI 112 comprises a graphical user interface operable to allow the user to interact with at least a portion of environment 100 for any suitable purpose, including generating a visual representation of the one or more web pages, documents, applications 114, or any other suitable visual representation of data on the device 102, as well as, through the use of the touch screen 121, provide touch-based input to the multi-touch device 102 and any of the software or processes executing on or through the device 102. Generally, the GUI 112 provides users with an efficient and user-friendly presentation of data provided by or communicated within the system. The term "graphical user interface," or GUI, may be used in the singular or in the plural to describe one or more graphical user interfaces and each of the displays of a particular graphical user interface. Therefore, the GUI 112 can be any graphical user interface, such as a web browser, touch screen, or command line interface (CLI) that processes information in the environment 100 and efficiently presents the results to the user. In general, the GUI 112 may include a plurality of user interface (UI) elements such as interactive fields, pull-down lists, and buttons operable by a user of the multi-touch device 102. These UI elements may be related to the functions of one or more applications 114 executing at the device 102, such as a business application or a web browser associated with the GUI 112, as well as the general functionality associated with the operating system or software environment executing on the device 102. In particular, the GUI 112 may be used in connection with the web browser associated with the GUI 112 to view and navigate to various web pages and/or web-based applications 124, some of which may be associated with (or provide a visual representation of) applications executed remotely from the multi-touch device 102.

In some instances, the GUI 112 is a software application which enables the multi-touch device 102 (or a user thereof) to display and interact with text, images, videos, music and other information associated with local applications 114 and/or web-based applications 124 located remote from the device 102, with the web-based applications 124 sending a visual representation of data or functionality to the multi-touch device 102 via network 120. In some instances, at least a portion of the GUI 112 may present information associated with a web browser, and can format web pages stored as HTML documents, XHTML documents, text files, or any other suitable files for display via the GUI 112. The visual appearance of a particular web page may differ between different web browsers, based on the web browsers particular method of displaying information, as well as based on settings defined by or for the multi-touch device (or for a specific user thereof). Example web browsers may include Microsoft's Internet Explorer, Mozilla's Firefox, Apple's Safari, Opera Software ASA's Opera browser, and Google's Chrome, as well as any other suitable browser, including browsers designed specifically for mobile or portable devices. In certain implementations, the web browser may be associated with, or may be a portion or module of, a business application, such as web-based application 124, that provides and displays data and functionality associated with the application through web-based processing and on-device visualization of the same.

FIG. 1 further illustrates an example of the external design of the multi-touch device 102a. As illustrated, the multi-touch device 102a includes a case 126, a touch screen 121 for displaying information and through which touch input is entered (described above), a set of permanent hardware buttons 128, a set of soft keys or software-based keyboard 135, an application window 114a displaying at least a portion of an executing application 114 (or web-based application 124), and a value interval slider 130. The case 126 may comprise any materials or structure housing the various portions of the multi-touch device 102a. Additionally, the case 126 may provide a functional or ornamental bezel surrounding the touch screen 121 and hardware buttons 128. The hardware buttons 128 may be any buttons included with the multi-touch device 102a, including a power button, a volume button, a physical keyboard, a back button, a home button, or any other physical button or key used in the operation of the device 102a. The application window 114a comprises at least a portion of the GUI 112a used to display visual output and/or information associated with a particular executing operation or application. It will be understood that in some implementations, multiple instances of application windows 114a associated with the same or different applications or operations may be presented simultaneously on the GUI 112a. Additionally, the multi-touch device 102a may allow for application windows 114a to be tiled, stacked, hidden, or otherwise moved and manipulated, for example, through specific touch and/or multi-touch gestures, as well as through manipulation of the hardware buttons 128 or soft keys (or software-based keyboard) 135. The value interval slider 130 comprises an interactive visualization of a value range selection tool for use with an application, operation, or other software, which allows users to apply touch and multi-touch gestures to the touch screen 121 to quickly and easily select a value interval relevant to the current operations of the device 102a. In one example, the value interval slider 130 can represent a time-based interval and selection device, wherein start and end dates associated with a reporting filter can be set. FIGS. 2 through 7B describe the use of the value interval slider 130 in further detail.

Returning to the mobile device 102a, a set of soft keys and/or a software-based keyboard 135 may also be presented on the GUI 112a. These software-based inputs allow for application- and/or operation-specific buttons and inputs to be presented in a particular application or operation context. For instance, an interactive form may include a "finish" button that is only provided when the application is in process or is completed. The soft keys and software-based keyboard 135 can be located in a particular position on the GUI 112a, or may be moveable around the GUI 112a through touch gestures. Furthermore, some applications and software may have buttons embedded or included within the application window 114a, which can be activated through a touch gesture in the appropriate location on the touch screen 121. In one example, a software-based keyboard 135 may be hidden during web browsing until a text box or other text-based input is needed or requested.

Returning to the block diagram of the environment 100 in FIG. 1, the network 120 can allow the multi-touch device 102 to communicate with the server 122 and at least a portion of the functionality provided by the server 122. At a high level, the server 122 comprises an electronic computing device operable to receive, transmit, process, store, or manage data and information associated with the environment 100. In general, server 122 may be any computer or processing device such as, for example, a blade server, general-purpose personal computer (PC), Macintosh, workstation, Unix-based computer, or any other suitable device. In other words, the present disclosure contemplates computers other than general purpose computers, as well as computers without conventional operating systems. Illustrated server 122 may be adapted to execute any operating system including Linux, UNIX, Windows Server, or any other suitable operating system. In some instances, such as that illustrated in FIG. 1, the server 122 hosts or executes a web-based application 124 which can then be viewed or interacted with at the multi-touch device 102 via the multi-touch device's GUI 112. Input and interactions at the multi-touch device 102 can be interpreted and relayed to the web-based application 124 in accordance with the application's 124 functionality and processing. The web-based application 124 can be any suitable application, including web- or cloud-based portions of a business application, such as an enterprise resource planning (ERP) system.

While FIG. 1 is described as containing or being associated with a plurality of components, not all components illustrated within the illustrated implementation of FIG. 1 may be utilized in each alternative implementation of the present disclosure. Additionally, one or more of the components described herein may be located external to environment 100, while in other instances, certain components may be included within or as a portion of one or more of the other described components, as well as other components not described. Further, certain components illustrated in FIG. 1 may be combined with other components, as well as used for alternative or additional purposes, in addition to those purposes described herein.

Figure 2:
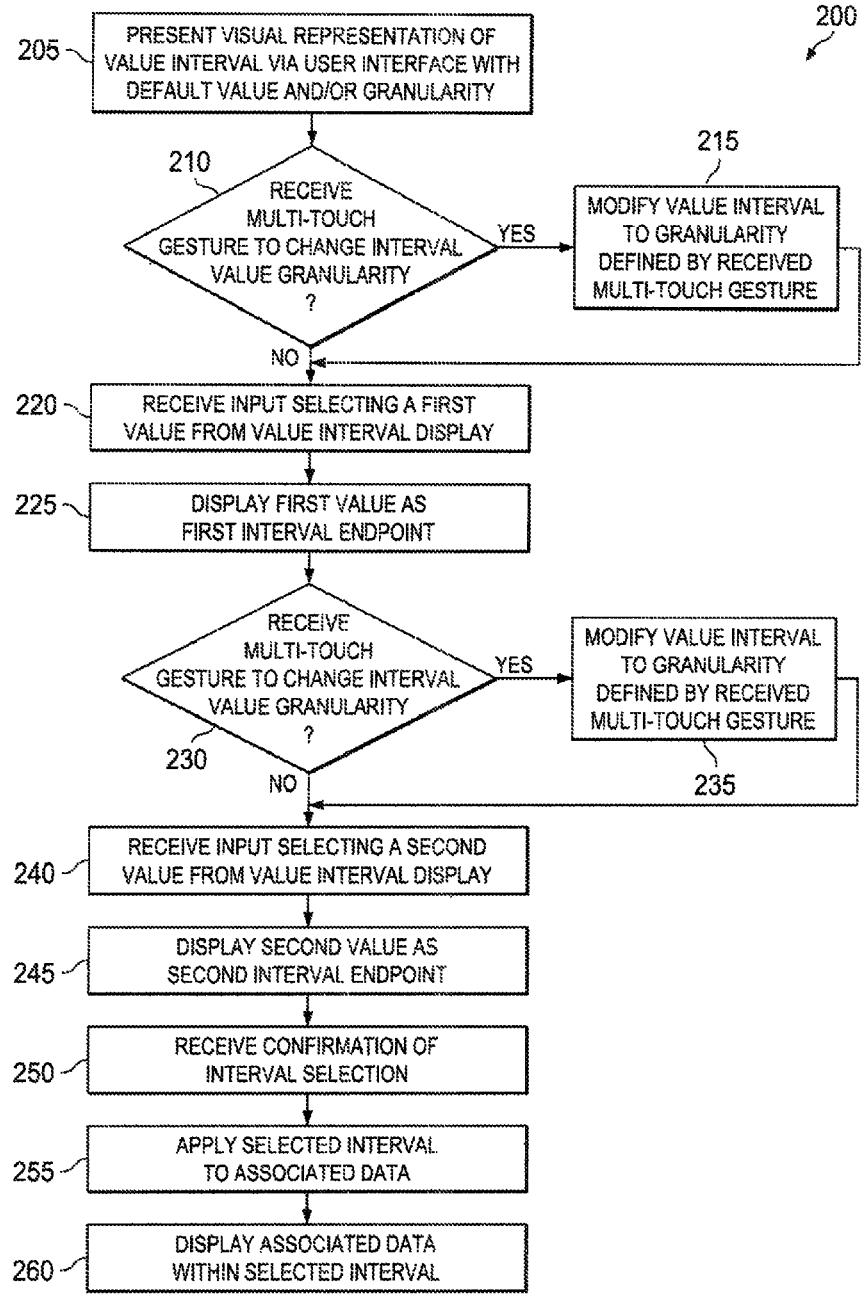
FIG. 2 is a flowchart illustrating an example method for presenting a value interval slider and receiving a value interval selection on a multi-touch device from the perspective of the multi-touch device in accordance with the example environment of FIG. 1.

FIG. 2 is a flowchart illustrating one particular implementation of a method 200 for presenting a value interval slider and receiving a value interval selection on a multi-touch device from the perspective of the multi-touch device. For clarity of presentation, the description that follows generally describes method 200 in the context of environment 100 illustrated in FIG. 1. However, it will be understood that method 200 may be performed, for example, by any other suitable system, environment, or combination of systems and environments, as appropriate.

At 205, method 200 presents a visual representation of a value interval, such as through a value interval slider, through a user interface (or GUI). One example of instances where a value interval slider may be used can include a time-based value interval for use in filtering analytical data, selecting dates and times for calendar entries, as well as any other time-based usage. In some instances, the value interval slider may be initially presented with a default value and/or a default granularity associated with application or software with which the value interval slider is being used. For example, in a time interval slider, the default granularity may be days, and the default value may be the current date. Alternatively, the default granularity may be hours, and the default value may be the current hour or time. The application or operation associated with the value interval can be used to determine (or may explicitly define in its instructions), a proper default granularity and/or default value.

Figure 3:
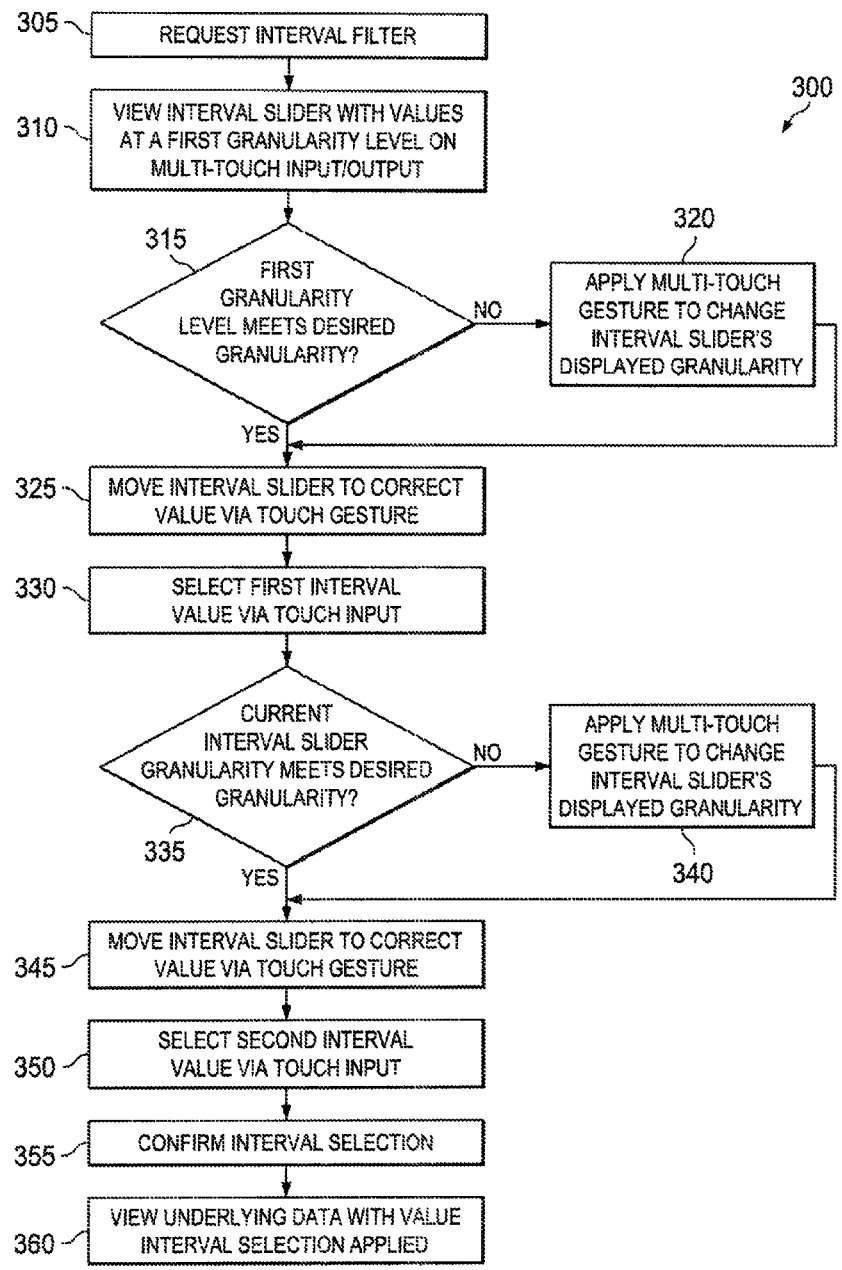
FIG. 3 is a flowchart illustrating an example method for viewing, manipulating, and selecting a value interval on a multi-touch device using a value interval slider from the perspective of a user associated with the multi-touch device in accordance with the example environment of FIG. 1.
Figure 4:
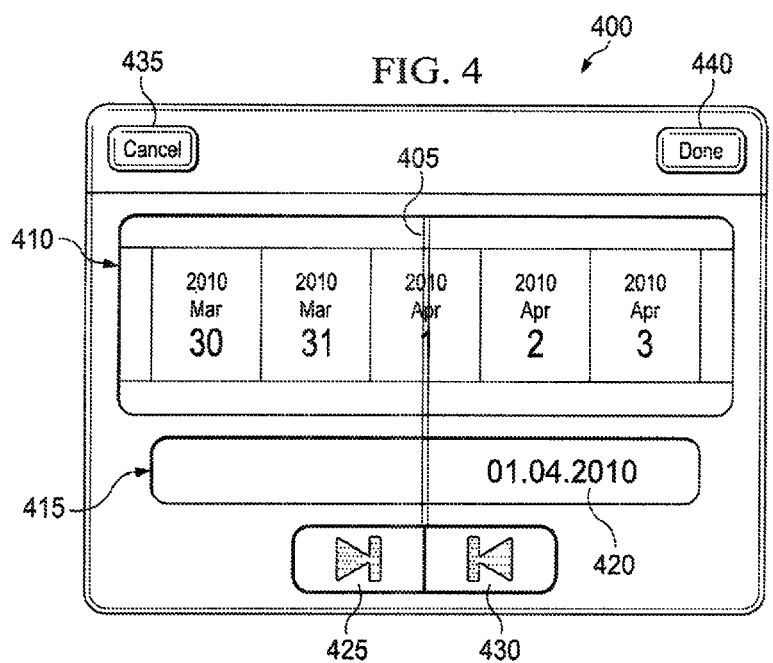
FIG. 4 is an example of a value interval slider for selecting value intervals in accordance with the example environment of FIG. 1.

The following examples, including those of FIGS. 2 through 7B, use a time interval slider as an example, although other suitable values and information may be used, as appropriate. FIG. 4 provides an example of a time interval slider 400 described herein. The arrow 405 illustrates an indicator for the current position on the value line (or in this case, the timeline). Specifically, the indicator 405 clearly identifies the current time value on which the time interval slider bar 410 is located. As illustrated, the indicator 405 shows that the current value under the indicator of the time interval slider bar 410 is listed as Apr. 1, 2010. The time interval slider bar 410 is an interactive value bar for visualizing the current timeline. Various touch and multi-touch gestures can be used to change the particular values being presented, as well as the particular value granularity presented in the time interval slider bar 410. Examples of manipulating the values are illustrated in FIGS. 5 through 7B, and are discussed below.

Figure 5:
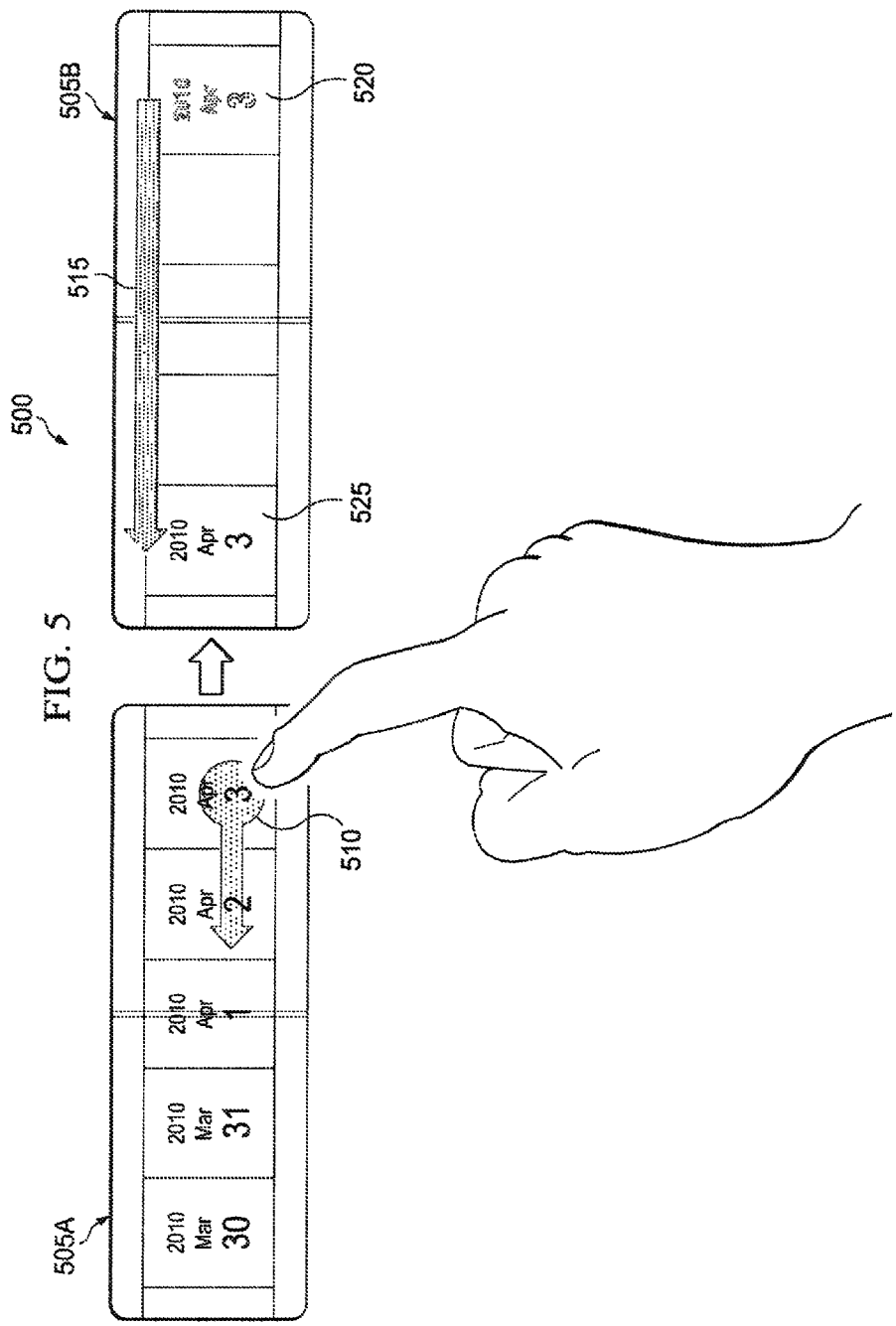
FIG. 5 is an example of scrolling using an example value interval slider to move between specific values of a particular granularity in accordance with the example environment of FIG. 1.

For example, FIG. 5 illustrates one particular method of moving between the values displayed in the time interval slider bar 410 (of FIG. 4), and within a single value granularity. As illustrated in the time interval slider bar 505A, a user touches (510) the value "Apr. 3, 2010." The user can then move the dates to the left by sliding the finger (or other touch input device) to the left, as illustrated by the line 515. As illustrated in the time interval slider bar 505B, the selected date of "Apr. 3, 2010" has moved from its original location 520 to its new location at 525. Similarly, the other values within the time interval slider bar 505B move to the left, as well. Although not illustrated in FIG. 5, it is understood that a similar motion can be used to move the values to the right as well. Any suitable touch or multi-touch gesture can be used to perform these actions. For instance, a swipe or movement gesture may also be used to move the values shown in a time interval slider bar. Additionally, different sliding, swiping, or other gesture speeds and/or pressure can be used to move the values faster or slower according to the touch input provided. In the present example, sliding only changes the values within a first level of granularity.

Returning to FIG. 4, below the time interval slider bar 410 are a start time field 415 and an end time field 420. The start time field 415 shows the value as selected by the user (or provided by the underlying or associated application) for the start of the time-based interval. Similarly, the end time field 420 shows the value as selected by the user (or provided by the underlying or associated application) for the end of the time-based interval. Again, although illustrated as a time value interval, any other suitable value intervals can be used.

Button 425 is a touch-based button that can be activated or selected in order to make the current value under the indicator 405 the value for the start of the time-based interval. Similarly, button 430 is a touch-based button that can be activated or selected to make the current value under the indicator 405 the value for the end of the time-based interval. In some instances, a value can be selected using a touch input (by touching the value). In one example, a value touched on the left side of the indicator will cause the touched value to become the start of the time-based interval, and a value touched on the right side of the indicator will cause the touched value to become the end of the time-based interval. As an example, if a user touched the value "Mar. 30, 2010", which is currently located to the left of the indicator in FIG. 4, the value "Mar. 30, 2010" would be shown as the start value for the time-based interval. Similarly, a value on the right side of the indicator 405, having been selected, would be shown as the end value for the time-based interval.

FIG. 6 illustrates one example of a value selection using a button similar to the start button 425 described above. As shown in the time interval slider 600, the illustrated indicator 610 is currently located over the value "Apr. 1, 2010." By activating or selecting button 620 (associated with the start value) through a touch input, the value identified by the indicator 610 is moved or displayed (630) in the start date field 640. Other suitable methods of entering start and end values may also be used.

Returning to FIG. 4, the time interval slider 400 also includes a cancel button 435 and a done button 440. In some instances, the time interval slider 400 will be presented in association or connection with a particular application (such as within an application window 114a of FIG. 1) in order to provide or apply a filter on data or information associated with the application. If a user elects not to add a filter to the information, the cancel button 435 may be selected, and the time interval slider 400 can be closed or minimized (or currently selected values can be cleared). If a user selects a start and end date, the done button 440 can be used to finalize the value interval selection and apply the filter.

Returning to FIG. 2, at 210 the multi-touch device 102 determines whether a multi-touch gesture requesting a change in the granularity of the values displayed in the time interval slider is received. As described in FIG. 1, the input-output interface 110, in connection with the touch screen 121, is capable of recognizing various multi-touch inputs. To change the granularity of the values in the time interval slider, any appropriate multi-touch gesture can be applied. Different applications may use different types of multi-touch gestures, and different multi-touch gestures may perform similar operations in a single application or environment. In some instances, such as when a particular application is executing, a multi-touch gesture may not have a corresponding command or action. In those instances, the received multi-touch gesture, after being compared to a multi-touch gesture list or database, may be ignored by the device 102, with no effect being given to the received motion. If no multi-touch gesture associated with a change in granularity is received, method 200 continues at 220.

Figure 7A:
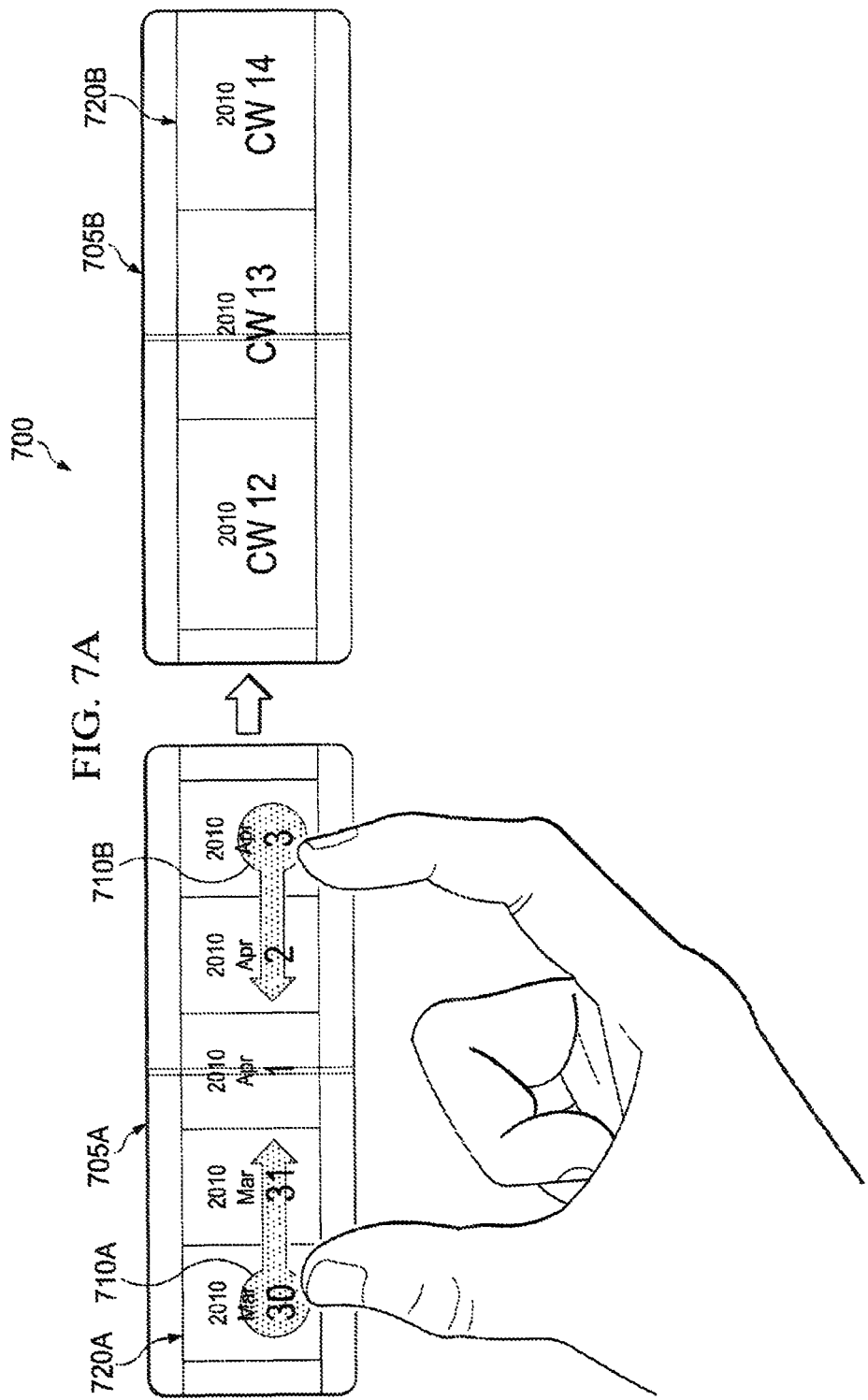
FIGS. 7A and 7B are examples of modifying the granularity level of the values presented in an example value interval slider through use of multi-touch gestures on the multi-touch enabled device in accordance with the example environment of FIG. 1.
Figure 7B:
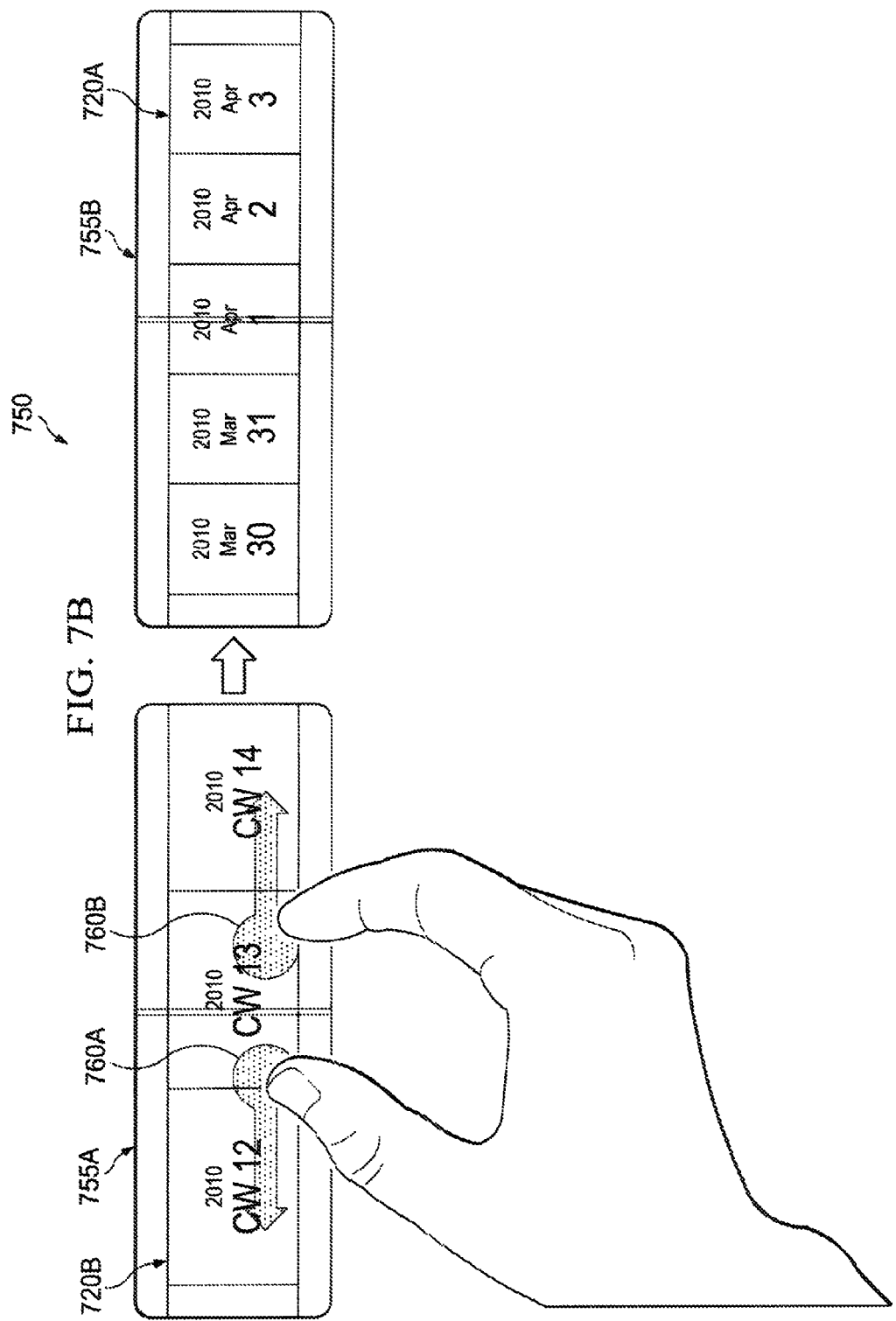

As an example, FIGS. 7A and 7B illustrate multi-touch gestures capable of and associated with changing the relative granularity of the time interval value slider. In FIG. 7A, the use of a pinch multi-touch gesture is used to raise the values to a higher level of granularity. For instance, FIG. 7A illustrates the change 700 between an initial instance of a time interval value slider 705A and a subsequent instance of a time interval slider 705B. The illustrated sliders instances 705A and 705B represent time values at a first granularity 720A (days in slider instance 705A) and a second granularity 720B (calendar weeks in slider instance 705B) after the pinch gesture is applied. As illustrated, a pinch gesture is applied by placing two fingers (710A and 710B) on a two portions of the time value bar simultaneously, and then moving the two fingers closer together. By moving the fingers together, the time values are essentially "compressed," such that the previous value granularity of days is replaced by a granularity of calendar weeks. Any change in granularity is possible, and a second pinching gesture (or a continuation of the first) may continue to show a granularity of months, years, decades, and so on. It will be understood that a similar concept can be applied to any suitable value types with varying levels of granularity.

FIG. 7B illustrates the use of a "reverse" pinch multi-touch gesture in order to change the granularity from a higher level of granularity to a lower level of granularity. The change 750 illustrated in FIG. 7B moves between an initial (or updated) instance of a time interval value slider 755A to a subsequent instance of the time interval value slider 755B. The granularity levels are a reverse of those shown in FIG. 7A—specifically, the time values move from a first granularity 720B (calendar weeks from FIG. 7A) to a second granularity 720A (days from FIG. 7A) when the "reverse" pinch multi-touch gesture is applied. The "reverse" pinch gesture is applied by again placing two fingers on the time value bar simultaneously, but unlike the pinch gesture, then moving the fingers apart from each other. By moving the fingers apart, the time values are "decompressed," with a higher level of granularity provided by the display. Again, any change in granularity is possible, with additional or continued "reverse" pinching resulting in moving from calendar weeks to days, hours, minutes, seconds, and so on.

Returning to FIG. 2, if the multi-touch device determines that a multi-touch gesture to change the granularity of the values is received, then at 215, the multi-touch device displays a value interval to the granularity defined by the received multi-touch gesture. As described, the change in the level of granularity, like the movement between values, may be effected in proportion to the speed or pressure at which the multi-touch gesture is made. For instance, a faster multi-touch gesture (such as the pinch gesture described above) may cause a change in values over more levels of granularity than a slower multi-gesture. In some instances, the device's reaction to the speed and pressure of the gestures may be defined or controlled by settings associated with the device. Additionally, the amount of granularity change may be controlled by the length of the gesture, as well. Further, some operations may move one granularity level at a time per multi-touch gesture, such as when the various granularity levels are highly discrete and/or distinct, thereby allowing a clear change in values without causing unnecessary or overly repetitive corrections to the granularity selection. In some instances, the transition from one granularity level to another may be presented by an animated transition from the original granularity level of values to the modified granularity level. Once a new granularity level is selected, method 200 continues at 220.

At 220, the multi-touch device receives an input selecting a first value from the value interval display or value interval bar. As previously described, the input selection may be made by the activation or selection of a start and/or end button, as well as by receiving a touch input associated with a value displayed at the user interface. In still other instances, the input may be received via a traditional input source, such as a mouse or keyboard. In particular, this may be used in situations where the displayed values are not limited to numbers, and may represent other types of hierarchical or granular information. Receiving the input selecting a first value may also include receiving one or more touch movements (or other inputs) moving between the displayed set of values at the current granularity level. For instance, in a time-based interval, a slide motion may move within the displayed days across one or more screens until a selection is made.

Once the input selection is received, method 200 continues at 225, where the first value is displayed as the first endpoint of the value interval. Depending on how the selection is made, the first selection could be the start or the stop endpoint of the interval. The multi-touch device can interpret the selection to determine the intent or meaning of the selection, such as by determining how the value was selected (i.e., by selecting the start or end button when the value is associated with an indicator, or by a direct touch input upon a particular value and that value's location relative to the indicator). In some instances, the first value can be displayed in a corresponding text or data field to show that a selection has been made. In some instances, the selected value may be stored in memory to ensure that a movement away from the value interval display (such as to a different program or display) does not lose the previously selected values.

After the first value is selected, the multi-touch device again determines whether a multi-touch gesture associated with changing the interval value granularity is received at 230. In some instances, values at the same granularity level may be appropriate for the value interval being selected, such as when choosing a set of similar values (i.e., months) over which the data is to be filtered. In those instances, no change to the granularity level of the value interval may be necessary, and method 200 may continue at 240. If, however, a multi-touch gesture associated with a change in value granularity level is received, method 200 continues at 235. At 235, the multi-touch device modifies the value interval displayed in the value interval bar to the granularity level as defined by the multi-touch gesture. Once the correct level of value granularity is reached, method 200 continues at 240.

At 240, the multi-touch device receives an input selecting a second value from the value interval display or value interval bar. Again, the value selection may be made by any suitable method, such as a start or end of interval button, as well as a touch input selecting a value located in a particular position on the value interval display (i.e., relative to a center point, such as a point relative to an indicator as illustrated in FIG. 4). At 245, the second value is displayed as the second endpoint of the value interval. In some instances, the second value may be saved into local or temporary memory to avoid accidental loss of the information.

Once an interval start and stop endpoint are selected, at 250 the multi-touch device receives a confirmation of the interval selection. In some instances, the confirmation may occur automatically once the second interval value is received, while in others, confirmation may require receiving an affirmative touch (or other type of) input explicitly confirming the interval values. Although not illustrated herein, one or both of the values can be modified numerous times prior to confirming the value interval, with the newer selected values overwriting the previous values. Modifications to the values can continue until the selected interval is confirmed, and in some cases, even after the selected interval is applied to the underlying data or application.

At 255, the selected and confirmed interval is applied to a set of underlying data or information associated with the application with which the value interval slider is associated. In some instances, this may include applying the values as a filter to a particular set of data, such as limiting reporting information to a particular timeframe within a selected time interval. Once the values of the selected interval are applied to the associated data or application, the multi-touch device can display any underlying or associated data within the selected interval. In some instances, this may modify a previously presented graph, chart, or report (as well as any other type of data visualization) in the multi-touch device's GUI, while in other instances, a newly generated visualization of data may be displayed at 260.

Although not illustrated in method 200, multi-touch gestures associated with changing the value granularity of the interval display may be received multiple times before or after an interval value is selected. Additionally, multiple value selections can be made such that previous selections are overwritten or discarded, and can continue until the selected and displayed interval is confirmed and/or applied to the underlying data.

FIG. 3 is a flowchart illustrating an example method 300 for viewing, manipulating, and selecting a value interval on a multi-touch device using a value interval slider from the perspective of a user. For clarity of presentation, the description that follows generally describes method 300 in the context of environment 100 illustrated in FIG. 1. However, it will be understood that method 300 may be performed, for example, by any other suitable system, environment, or combination of systems and environments as appropriate.

At 305, a user submits a request to apply a filter over an interval value to a particular set of data or information. Generally, the interval filter may be applied to any data or information used or associated with an application with which the user is interacting. For instance, a calendar application or date selection operation may be a natural use for the value interval slider, particularly on a mobile, multi-touch device. The time interval slider provides a single display for selecting the desired time filter or values, while allowing varying levels of value granularity to be viewed and selected in the single display. One endpoint of the interval may be a value at a first granularity (e.g., a specific day), while the second endpoint can be a value at a second, and different granularity (e.g., a year). Other embodiments can include different values being used as the value interval, such as locations. For example, the value granularities may move from specific street addresses, to streets, to city areas, to cities, to cities and surrounding areas, to portions of a state, to a state, to a country region, to a country, to a group of countries, and so on. In one example, these location-based granularities can be used to find or determine directions from one location to another. For example, using these different values, a user can select a general (or specific) start point for directions, and a more specific or more general stop (or finish) endpoint. This may be of use where the user has an understanding of one of the start location or the end location, but needs specific directions to the end location. In general, any information with varying granularities, or hierarchies, of values can be used with a value interval slider. Another example may be varying levels of sales information. A start value may be related to a specific product (e.g., sales for a specific pair of pants), while the stop value may be a general product type or product line (e.g., sales for a general clothing division). By using the multi-touch gestures, the varying levels of granularity can be viewed and selected at the user's commands, such that vast amounts of data and information can be presented within the single line display of the value interval. In general, any value sets with data or values at varying hierarchical levels can make use of the present disclosure. Using the appropriate multi-touch gestures, varying hierarchical levels of values can be explored and selected in the value interval slider. Any suitable hierarchy, including organizational charts, business object and attributes sets, and others can be used.

Returning to FIG. 3, at 310 the user is presented with and views the value interval slider on the multi-touch device's display, with the values of the value interval being displayed at a first granularity level and at a first set of specific values. Depending on the specific use case for the user, a different granularity level of data may be needed or desired. At 315, if the first granularity level of values meets the user's desired granularity, however, method 300 can continue at 325. If, however, a level of granularity different from the initial level of granularity is needed or desired, at 320 the user can apply any suitable multi-touch gesture (generally within the set of time slider values themselves) associated with changing the granularity of the values within the interval. In some instances, the multi-touch gesture could be a pinch or reverse pinch gesture, although any suitable multi-touch gesture can also be associated with and perform the value granularity change. In some instances, a single change to the granularity value may not be sufficient, such that additional changes (and corresponding multi-touch gestures) can be applied until the user is satisfied with the displayed granularity. Further, changes to the granularity may be made at any time prior to the confirmation and submission of the interval values.

Continuing at 325, the user can move (e.g., using a slide, swipe, movement, or other suitable touch gesture) the interval slider to the correct or desired value. FIG. 5 described above illustrates one method of moving through the interval values. Once the correct value is identified, the user can select the first interval value via touch input at 330. Again, one method of selecting a value is described in connection with FIG. 6, above. In those instances, specific buttons mapped to the start and end field can be used to select a value from the value interval slider for either the start or end field of the value interval. Other methods of selection are also possible, including touching the specific value, and making it the start or end value based upon its displayed location, as compared to some reference point in the value interval slider. Still further, a touch gesture, such as a drag-and-drop gesture, may be used to pull a specific value into the appropriate start or end location. Upon selecting the first interval value, in many cases the multi-touch device (e.g., using one or more fields associated with the value interval slider) may display the selected value in order to provide visual feedback of the selection to the user. Further, in some instances, the selected value may be shaded, colored, or otherwise provided a distinct characteristic on the value interval display to allow the user to quickly ascertain the currently selected first value. In some instances, the selected value may be kept as a placeholder value on either side of the time value slider, regardless of the value granularity level of the value interval slider itself.

Once the first value (whether a start or stop endpoint) is selected, method 300 continues at 335, where the user determines whether the current level of granularity for the value interval slider values meets the user's desired granularity level for the second input. If the granularity is correct, method 300 continues at 345. If, however, the current granularity is not sufficient for the user's purpose, method 300 moves to 340 where one or more suitable multi-touch gestures can be applied to the value interval slider to change or modify the value interval slider's displayed granularity. Once the appropriate level of granularity is reached, method 300 continues at 345. At 345, the user again moves the value interval slider to the correct or desired value using the appropriate touch gesture. As discussed above, the user may at any time need or wish to view a different granularity level than currently displayed. In those instances, the user can simply apply the multi-touch gesture appropriate for the desired change (using the actions described at 320 and 340) and return to 345 where the appropriate value is displayed. At 350, the user selects the second interval value using an appropriate touch input. The touch input used at 350 may be similar to that used at 330, although in some instances, alternative methods of input may be used, as well. Upon selecting the second value, in many cases the multi-touch device (e.g., using one or more fields associated with the value interval slider) may display the selected value in order to provide visual feedback of the selection to the user.

Once the start and stop endpoint values are selected, the user can confirm the identified and selected value interval at 355. In some instances, specific buttons (such as a "Done" or "Confirmation" button) can be activated or selected by the user to finalize the value selections. Additionally, the user can cancel the selections (e.g., using a "Cancel" or "Clear" button) to cancel the entire selection or clear the selected values. Once the values are confirmed, the user may then be presented with a visualization of a set of underlying data with the selected and confirmed value interval applied at 360. In some instances, this may include receiving a display of a subset of a report or reporting information to the user showing the information over the specific period of time selected using method 300. Alternatively, the selected values may instead be input as the values in an application input, such as start and end dates or times for meetings, trips, or any other suitable time-based inputs. Still further, if the information selected was product or industry values, only information associated with those values would be shown from the underlying or associated data, or the specific intervals would be provided as a particular input.

While the present disclosure uses a plurality of flowcharts and accompanying descriptions to illustrate the example techniques associated with various methods of FIGS. 2 and 3, environment 100 contemplates using or implementing any suitable technique for performing these and other tasks. It will be understood that these techniques are for illustration purposes only and that the described or similar techniques may be performed at any appropriate time, including concurrently, individually, or in combination. In addition, many of the steps in these flowcharts may take place simultaneously and/or in different orders than as shown and described. Moreover, environment 100 may use processes and methods with additional, fewer, and/or different steps, so long as the processes and methods remain appropriate.

Although this disclosure has been described in terms of certain implementation and generally associated methods, alterations and permutations of these implementations and methods will be apparent to those skilled in the art. For example, the actions described herein can be performed in a different order than as described and still achieve desirable results. As one example, the processes depicted in the accompanying figures do not necessarily require the particular order shown, or sequential order, to achieve the desired results. In certain implementations, multitasking and parallel processing may be advantageous. Other variations are within the scope of the following claims.

What is claimed is:

1. A method for receiving time-based interval selections on a multi-touch device comprising:
displaying a time interval slider in a portion of a graphical user interface (GUI), the time interval slider comprising a single slider presenting a listing of time values in a single dimension at a first granularity level;
receiving a selection of a first time value on the time interval slider for a first endpoint in a time interval at the first granularity level, the selection received via a first touch input associated with the time interval slider;
presenting, within the time interval slider and in response to receiving the selection of the first time value, a graphical indication of the selection of the first time value as the first endpoint;
receiving a request, via a multi-touch gesture received by touch contact applied within the time interval slider displayed in the GUI, to change the listing of time values from the first granularity level of time values to a second granularity level of time values;
displaying, within the time interval slider, an updated set of time values at the second granularity level in response to the multi-touch gesture;
receiving, after displaying the updated set of time values at the second granularity level, a selection of a second time value at the second granularity level on the time interval slider for a second endpoint in the time interval, the selection received via a second touch input associated with the time interval slider; and
presenting, within the time interval slider and in response to receiving the selection of the second time value, a graphical indication of the selection of the second time value as the second endpoint;
wherein receiving a selection of a time value on the time interval slider via a touch input comprises:
identifying the location of the touch input on the time interval slider in relation to a fixed central reference point of the time interval slider; and
based on the location of the touch input in relation to the fixed central reference point, assigning the selected time value as a start or stop endpoint of the time interval.

2. The method of claim 1, wherein a second request to change from the first granularity of time values to a second granularity level of time values is received prior to receiving the selection of the first time value.

3. The method of claim 1, where the first granularity level and the second granularity level of time values comprise at least one of the following, but not the same, time values: seconds, minutes, hours, days, weeks, days, months, and years.

4. The method of claim 1 further comprising:
upon receiving the selection of the first time value, storing the first time value as a first endpoint in the time interval;
upon receiving the selection of the second time value, storing the second time value as a second endpoint in the time interval; and
applying the time interval defined by the first endpoint and the second endpoint.

5. The method of claim 4, wherein the time interval defined by the first endpoint and the second endpoint is applied as a filter to a set of data, as a time interval value in an application, or as information to be provided to an application.

6. The method of claim 1 wherein assigning the selected time value as the start or stop endpoint of the time interval comprises:
assigning the selected time as the start endpoint of the time interval if the location of the touch input is to the left of the fixed central reference point; and
assigning the selected time as the stop endpoint of the time interval if the location of the touch input is to the right of the fixed central reference point.

7. The method of claim 1, wherein the multi-touch gesture comprises:
a pinch gesture comprising a request to move from a relatively smaller time granularity level to a relatively larger time granularity level; and
a reverse pinch gesture comprising a request to move from a relatively larger time granularity level to a relatively smaller time granularity level.

8. The method of claim 1, wherein the request to change from the first granularity level of time values to a second granularity level of time values is dependent upon the relative pressure of the received multi-touch gesture.

9. The method of claim 1, wherein the request to change from the first granularity level of time values to a second granularity level of time values is dependent upon the relative speed of the received multi-touch gesture.

10. The method of claim 1, wherein the single dimension comprises a displayed row of values.

11. The method of claim 1, wherein displaying the updated set of time values at a second granularity level within the time interval slider in response to the received multi-touch gesture comprises an animated change from the display of the first granularity level to the display of the second granularity level.

12. A method for receiving value-based interval selections on a multi-touch device comprising:
displaying a value interval slider in at least a portion of a graphical user interface (GUI) on a touch screen display, the value interval slider comprising a single slider presenting a one-dimensional display of values at a first granularity level, where each granularity level comprises a set of values at a particular hierarchical level;
receiving a selection of a first value on the value interval slider for a first endpoint in an interval at the first granularity level, the selection received via a first touch input associated with the value interval slider;

presenting, within the value interval slider and in response to receiving the selection of the first value, a graphical indication of the selection of the first value as the first endpoint;

receiving a request, via a multi-touch gesture received by touch contact applied within the value interval slider displayed in the GUI, to change the one-dimensional display of values from the first granularity level of values to a second granularity level of values in the value interval slider;

displaying, within the value interval slider, an updated set of values at a second granularity level in response to the multi-touch gesture;

receiving, after displaying the updated set of one-dimensional display of values at the second granularity level, a selection of a second value at the second granularity level on the value interval slider for a second endpoint in the value interval via touch input; and presenting, within the value interval slider and in response to receiving the selection of the second value, a graphical indication of the selection of the second value as the second endpoint;

wherein receiving a selection of a value on the value interval slider via a touch input comprises:
identifying the location of the touch input on the value interval slider in relation to a fixed reference point of the value interval slider; and
based on the location of the touch input in relation to the fixed reference point, assigning the selected value as a start or stop endpoint of the value interval.

13. The method of claim 12, wherein the values at each granularity level comprise values within a distinct hierarchical relationship.

14. The method of claim 13, wherein the values of the first granularity level comprise values within a first hierarchical level, and where the values of the second granularity level comprise values within a second hierarchical level different from the first hierarchical level.

15. The method of claim 12, wherein the multi-touch gesture comprises:
a pinch gesture comprising a request to move from a relatively lower hierarchical level to a relatively higher hierarchical level; and
a reverse pinch gesture comprising a request to move from a relatively larger hierarchical level to a relatively smaller hierarchical level.

16. The method of claim 12, wherein the request to change from the first granularity level to a second granularity level is dependent upon at least one of the relative pressure or speed of the received multi-touch gesture.

17. The method of claim 12, wherein the request to change from the first granularity level to the second granularity level is received prior to receiving the selection of the first value.

18. A non-transitory computer readable storage medium storing one or more programs, the one or more programs comprising instructions, which when executed by a device, cause the device to:
display a time interval slider in a portion of a graphical user interface (GUI), the time interval slider comprising a single slider presenting a listing of time values in a single dimension at a first granularity level;
receive a selection of a first time value on the time interval slider for a first endpoint in a time interval at the first granularity level, the selection received via a first touch input associated with the time interval slider;
present, within the time interval slider and in response to receiving the selection of the first time value, a graphical indication of the selection of the first time value as the first endpoint;
receive a request, via a multi-touch gesture received by touch contact applied within the value interval slider displayed in the GUI, to change the listing of time values from the first granularity level of time values to a second granularity level of time values;
display, within the time interval slider, an updated set of time values at the second granularity level in response to the multi-touch gesture; and
receive, after displaying the updated set of time values at the second granularity level, a selection of a second time value at the second granularity level on the time interval slider for a second endpoint in the time interval, the selection received via a second touch input associated with the time interval slider; and
present, within the time interval slider and in response to receiving the selection of the second time value, a graphical indication of the selection of the second time value as the second endpoint;
wherein receiving a selection of a time value on the time interval slider via a touch input comprises:
identifying the location of the touch input on the time interval slider in relation to a fixed reference point of the time interval slider; and
based on the location of the touch input in relation to the fixed reference point, assigning the selected time value as a start or stop endpoint of the time interval, wherein assigning the selected time value as a start or stop endpoint of the time interval comprises:
assigning the selected time as the start endpoint of the time interval if the location of the touch input is to the left of the fixed reference point; and
assigning the selected time as the stop endpoint of the time interval if the location of the touch input is to the right of the reference point.

19. The non-transitory computer readable storage medium of claim 18, wherein the request to change from the first granularity of time values to a second granularity level of time values is received prior to receiving the selection of the first time value.

20. The non-transitory computer readable storage medium of claim 18, further comprising instructions operable when executed by the device to:
store the first time value as a first endpoint in the time interval upon receiving the selection of the first time value;
store the second time value as a second endpoint in the time interval upon receiving the selection of the second time value; and
apply the time interval defined by the first endpoint and the second endpoint.

21. The method of claim 1, wherein the graphical indication of the selection of the first time value is a placeholder time displayed in a first placeholder location associated with the time interval slider.

22. The method of claim 1, wherein presenting the graphical indication of the selection of the first time value or the second time value includes at least one of shading, coloring, or distinguishing the selected first or second time value from non-selected time values.

23. The method of claim 1, wherein the graphical indication of the selection of the second time value is a placeholder time displayed in a second placeholder location associated with the time interval slider.

24. The method of claim 12, wherein the graphical indication of the selection of the first value is a placeholder value displayed in a first placeholder location associated with the time interval slider.

25. The method of claim 12, wherein presenting the graphical indication of the selection of the first value or the second value includes at least one of shading, coloring, or distinguishing the selected first or second value from non-selected values.

26. The method of claim 12, wherein the fixed reference point is a fixed central reference point, and wherein assigning the selected value as a start or stop endpoint of the value interval comprises:
- assigning the selected value as the start endpoint of the value interval if the location of the touch input is to the left of the fixed central reference point; and
- assigning the selected value as the stop endpoint of the value interval if the location of the touch input is to the right of the fixed central reference point.

\* \* \* \* \*